United States Patent [19]
Vollenbroek

[11] Patent Number: 5,638,160
[45] Date of Patent: Jun. 10, 1997

[54] TRANSPORT DEVICE FOR DEVELOPER POWDER

[75] Inventor: Robertus M. Vollenbroek, Roermond, Netherlands

[73] Assignee: OCE-Nederland, B.V., Venlo, Netherlands

[21] Appl. No.: 344,670

[22] Filed: Nov. 22, 1994

[30] Foreign Application Priority Data

Dec. 9, 1993 [NL] Netherlands ............................ 9302145

[51] Int. Cl.⁶ .................................................. G03G 15/06
[52] U.S. Cl. .................................................. 399/258
[58] Field of Search ............................ 355/298, 260; 222/DIG. 1, 378, 382, 240, 241, 321.6

[56] References Cited

U.S. PATENT DOCUMENTS

| | | | |
|---|---|---|---|
| 3,715,119 | 2/1973 | Shelley et al. | 222/241 X |
| 3,913,343 | 10/1975 | Rowland et al. | |
| 4,151,932 | 5/1979 | Wachtler | 222/241 X |
| 4,945,956 | 8/1990 | Bueyuekgueclue | 141/67 |
| 5,074,342 | 12/1991 | Kraehn | 355/260 X |

FOREIGN PATENT DOCUMENTS

| | | |
|---|---|---|
| 0256862 | 2/1988 | European Pat. Off. . |
| 0462912 | 12/1991 | European Pat. Off. . |
| 58-137860 | 8/1983 | Japan . |
| 58-182660 | 10/1983 | Japan . |

*Primary Examiner*—Robert Beatty
*Attorney, Agent, or Firm*—Birch, Stewart, Kolasch & Birch, LLP

[57] ABSTRACT

A transport device for supplying developer powder from a lower-level reservoir to a developing station by a rotatable spiral spring contained in a transport tube, which transport tube has an inlet aperture near the lowest point of the reservoir, together with a spiral spring, blades which rotate around the inlet aperture provided with an inlet blade to push developer powder in the transport tube in order to ensure upwards transportation of developer powder, even in the event of a low level in the tube. A low-level detection element is coupled to the rotating blades to prevent the conveyor pipe emptying and a pipeline effect occurring as a result of the developer powder in the reservoir running out.

12 Claims, 3 Drawing Sheets

TRANSPORT DEVICE FOR DEVELOPER POWDER

BACKGROUND OF THE INVENTION

1. Field of the Invention

The instant invention relates to an image development system, and more specifically, to a device for transporting developer powder from a reservoir to a developing station.

2. Discussion of Related Art

A device of this kind is known from EP-A-0256862. In this known device, for transporting a magnetic developer powder from a lower-level reservoir to a higher-level developing station, magnetic means are provided which pull against the tube wall powder particles for transport through the tube to allow powder transport in the upward direction in the tube by means of a helical transport means. One disadvantage of this method of transporting developer powder is the presence of magnets formed around the tube, such magnets requiring a complex construction adapted to the tube shape. Another disadvantage is that the known device is only usable for raising or transporting developer powder having magnetic properties.

SUMMARY OF THE INVENTION

Therefore, it is an object of the present invention to provide a developer transport system which will overcome the above-noted disadvantages.

A further object of the present invention is to provide a means of transporting various forms of developers upward to a developing zone.

Another object of the present invention is to provide a transport means for raising developer powder within an imaging system eliminating the need for using magnets.

The foregoing objects and others are accomplished in accordance with the present invention, generally speaking, wherein a reservoir for developer is provided at a level lower than that of a developing station. A device joins the reservoir with the developing station. The device comprises a tube provided with an inlet aperture at the reservoir and an outflow aperture at the developing station, the outflow aperture in the operative state being at a higher level than the inlet aperture, and a helical transport means disposed in the tube, rotatable about its longitudinal axis, which transport means, on rotation, can feed developer powder from the inlet aperture to the outflow aperture. A pushing means is provided in the reservoir to push developer powder present in the reservoir through the inlet aperture in the tube. Consequently, to raise the developer powder a powder transport device is provided which requires no adaptation to the transport tube and leaves the outside of the latter free, the device also being usable for raising non-magnetic developer powder by means of a conveyor screw.

In one advantageous embodiment of the device according to the present invention, the inlet aperture is formed by a hole in a wall part of the fixed tube which fits in the reservoir, the pushing means comprising at least one blade which is rotatable about the rotational axis of the transport means and which forms an obtuse angle α with a radial plane through the rotational axis intersecting the blade edge closest to the rotational axis.

In a further attractive embodiment of the device according to the present invention, the inlet aperture lies in a plane forming an acute angle β with a radial plane through the rotational axis which intersects the edge of the inlet aperture furthest away from the rotational axis.

These embodiments are a simple way of ensuring that there is sufficient flow of developer powder to the inlet aperture of the tube, even in the event of a low level of developer in the reservoir, in order to ensure upwards transport of the developer powder through the tube.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DISCUSSION OF THE INVENTION

Figure 1:
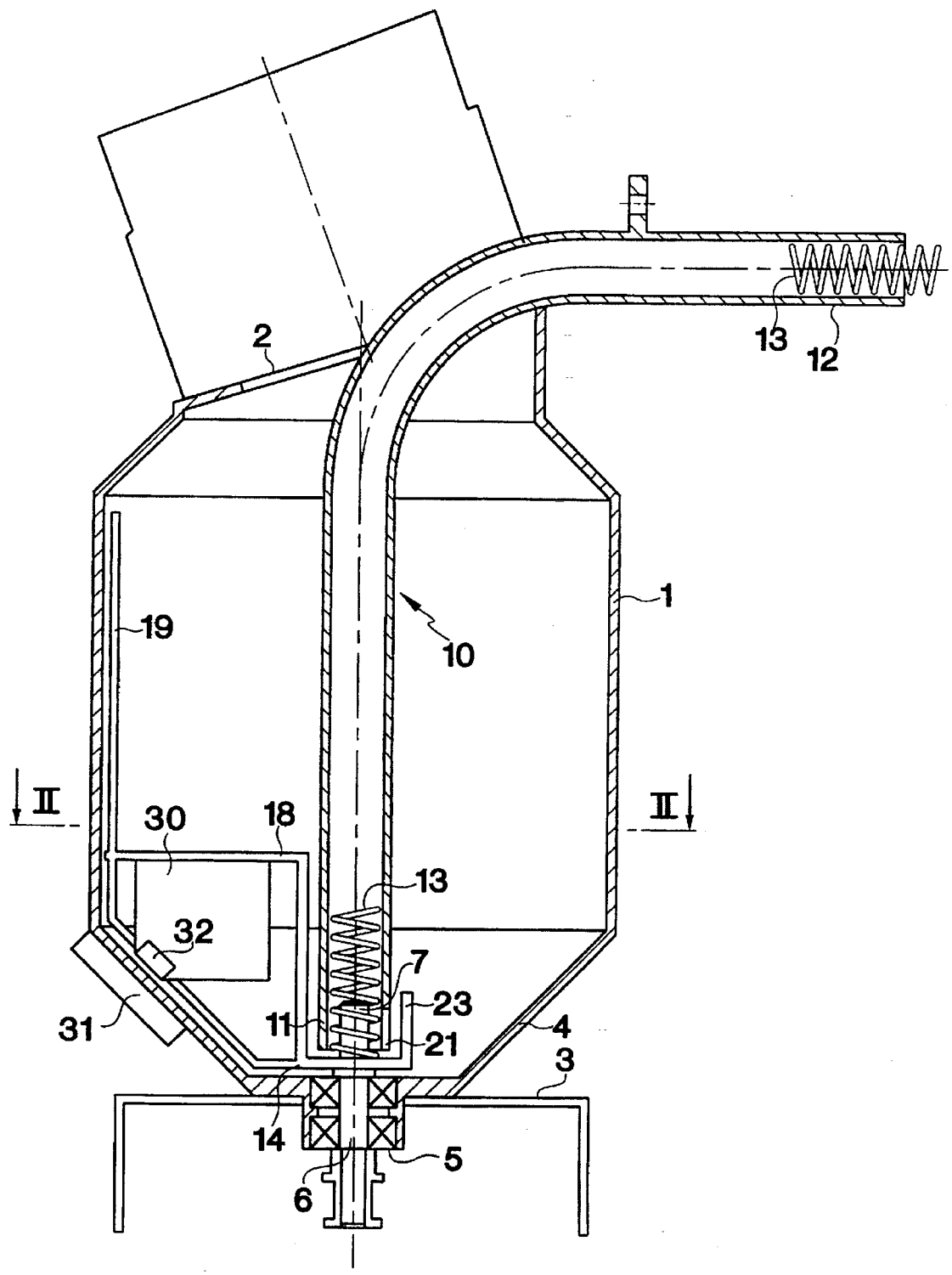
FIG. 1 is a cross-section of the device according to the invention.

The device shown in FIG. 1 comprises a cylindrical reservoir 1 with a vertical cylinder axis, the top of the reservoir 1 being provided with a closable filling aperture 2 for filling the reservoir 1 with developer powder from a transport packing (not shown), e.g. a top-up bottle. Using as a basis a top-up bottle which can contain 400 grams of developer powder, which quantity must be capable of being introduced into the reservoir in one operation, and in the event of residual powder left in the reservoir being 100 grams, the reservoir must be capable of containing a total of 500 grams of developer powder. The volume of the reservoir is derived from the specific gravity of loosened (aerated) developer powder, which is for example 0.3 kg/dm$^3$. In the case of the reservoir shown in FIG. 1, its height is approximately equal to its diameter. The upright cylindrical reservoir 1 is fixed by a strap 3 in an electrophotographic copier, is not shown, at a place which can be distant from the developing device contained therein.

The reservoir 1 has a conical base 4 provided with a shaft bushing 5 along the cylinder axis. A shaft 6 is mounted in the shaft bushing 5 and outside the reservoir 1 is coupled to a drive (not shown), while inside the reservoir 1 it has an axle stub 7, to which elements movable in the reservoir are fixed, as will be described hereinafter. A transport tube 10 of round cross-section is fixed in the reservoir 1 and extends therein from the axle stub 7, around which the tube end 11 fits with ample clearance, upwards, straight at first through the reservoir and then with an ample bend to outside the reservoir. The following part 12 of the transport tube outside the reservoir 1, which may be flexible to some extent, extends horizontally to a developing device of the copier, in which developing device the transport tube leads into a powder mixing section where supplied developer powder is mixed with the developer powder still present. A spiral powder transport spring 13 is disposed in the transport tube 10 its entire length. The coils of the spring 13 fit with a slight clearance inside the tube 10. One end of the spring 13 drops around the axle stub 7 and is rigidly secured to a rotor 14 fixed on the shaft 6.

The rotor 14 carries elements for loosening the developer powder in the reservoir and for keeping it in a free-flowing form, and elements to promote the flow of the developer powder to the lowest part of the reservoir 1, thus preventing compacting and bridge formation of the developer powder in the reservoir. An L-shaped agitator bar 18 forming part of the rotor 14, rotatable around the transport tube 10 serves to keep the powder free-flowing. To prevent bridge formation a 1 mm thick wire 19 is used, which also forms part of the rotor 14, rotatable about the transport tube 10 and which moves at a distance of about 2 mm along the side wall of the reservoir, i.e. without making contact therewith, in order to prevent powder from caking against the wall.

Figure 2:
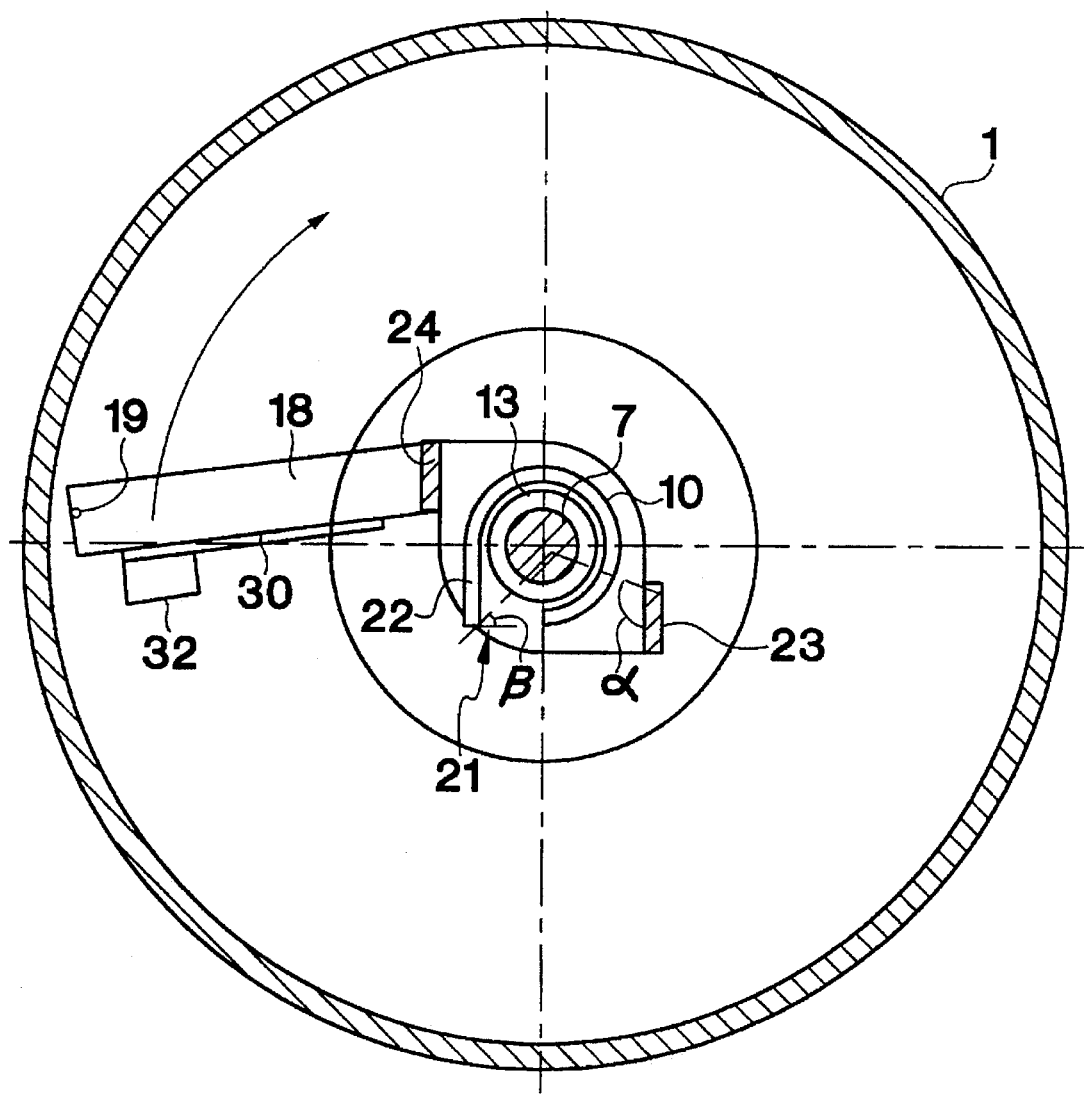
FIG. 2 is a cross-section along the line II—II in FIG. 1.

At the part of the transport spring 13 situated around the axle stub 7 the transport tube 10 is provided with a funnel-shaped inflow aperture 21, the top edge of which is lower than the top of the axle stub 7. The funnel-shaped opening 21, as shown in FIG. 2, is made by a break in the tube wall over a quarter of the cylindrical tube periphery and the formation of a flat blade 22 which extends from one side of the break tangentially outwards over a distance equal to the radius of the outside cross-section of the transport tube 10. The funnel-shaped inflow aperture is thus formed with an outermost inflow plane including an angle $\beta$ of 45° with a radial plane passing through the outermost edge of the flat blade 22. Two diametrically opposite blades 23 and 24 are disposed on the rotor 14, level with the funnel-shaped aperture 21, and each forms an angle $\alpha$ of 110° with a radial plane passing through the edge of the blade closest to the center of the reservoir 1. The angles $\alpha$ and $\beta$ can vary within specific limits without affecting their proper operation, e.g. within limits of ±15°.

On rotation of the rotor 14, the operative surfaces of each of the blades 23 and 24 each exert an inwardly directed force on the developer powder to press the powder into the inlet aperture 21 of the transport tube 10 to the bottom coils of the transport spring 13, which carry the developer powder up through the transport tube 10. The pushing produced by the blades 22, 23 and 24 ensures that even if the level in the reservoir is low, sufficient powder transport is maintained through the transport tube 10.

The operation of the device will now be described further with reference to FIG. 3. A test rig is made with a 305 mm long transport tube 10 having an inside diameter of 15 mm. The transport tube has an approximately 150 mm long vertical part, a bend with an inside radius of 50 mm, and a horizontal part approximately 80 mm long provided with an outflow aperture 12. The inlet aperture 21 in the bottom part 11 of the transport tube 10 has a height of 10 mm and the axle stub 7 projects a distance of 15 mm into the transport tube 10. A transport spring 13 made of 0.5 mm thick spring steel is disposed in the transport tube 10 and has an outside diameter of 13 mm, an inside diameter of 9 mm and a pitch of 5 mm. With this test rig, and a speed of rotation of 35 rpm for rotor 14, a maximum rate of flow (V) of 4 g per min. is measured when the reservoir 1 is completely full and 0 grams developer powder discharged. When 430 grams of developer powder has been discharged and the reservoir, filled with 500 grams, is thus almost empty, the measured rate of flow (V) dropped to about 2.5 g per min.

Figure 3:
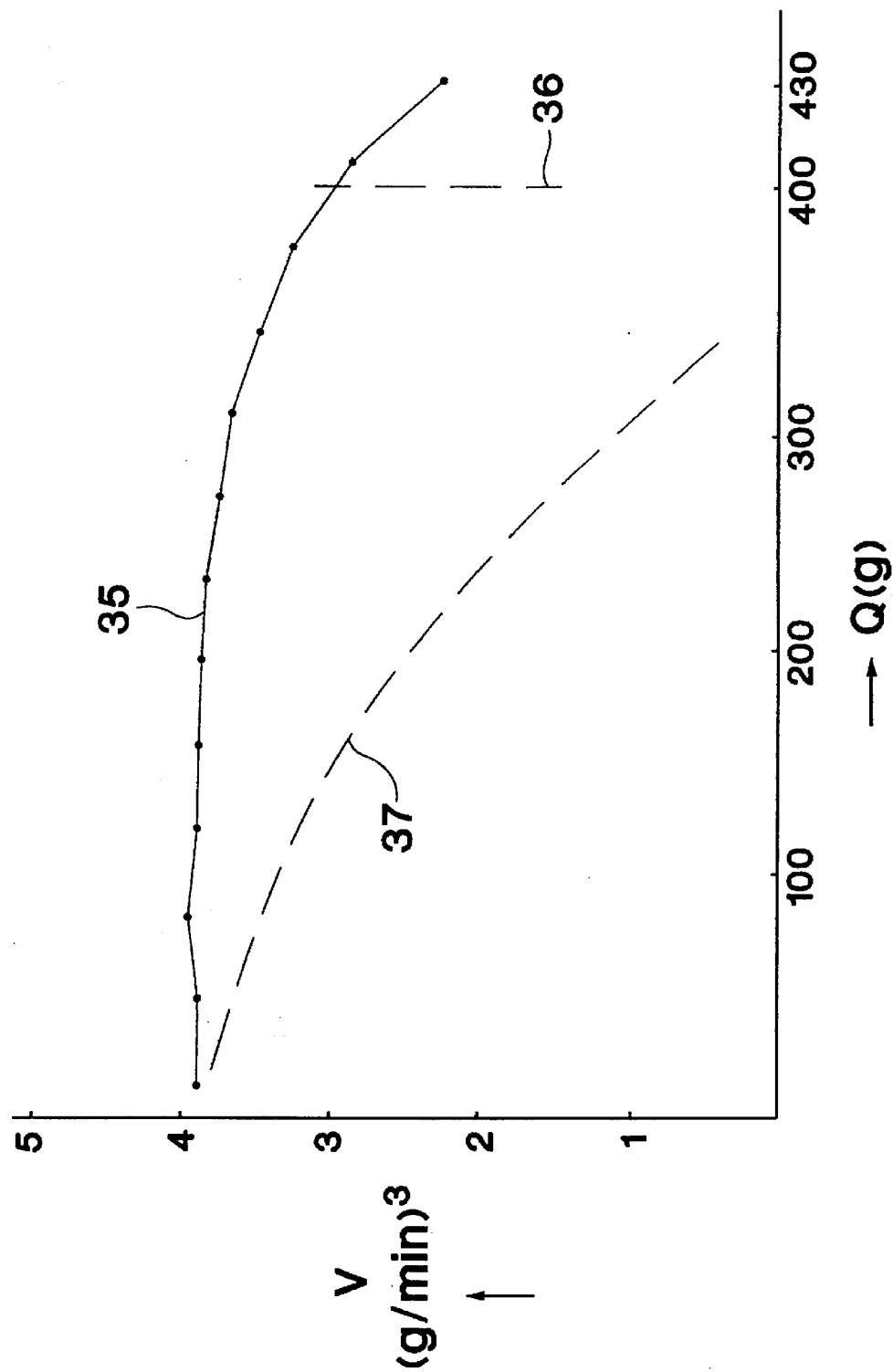
FIG. 3 graphically shows the relationship between the quantity of developer powder transportable through the tube per unit of time with the device shown in FIGS. 1 and 2, and the level in the reservoir.

In FIG. 3, line 35 denotes the value of the measured rate of flow (V) against the quantity of developer powder discharged (Q). After the powder transport device is started with reservoir 1 full and transport tube 10 still empty, it will be some time before developer powder leaves the transport tube 10 (about 4 minutes in the test rig). In order to prevent the transport tube 10 from also becoming empty in the event of the reservoir 1 emptying, a signal to replenish the reservoir 1 is given when there is still a residual supply, for example, of 100 grams present and the transport device is rendered inoperative until the reservoir has been replenished. This avoids any pipeline effect in the transport tube and also has the effect that the spread of the rate of flow (V) in dependence on the degree of filling of the reservoir 1 remains restricted. On stoppage of the rotor 1 after delivery of about 400 grams of developer powder from a reservoir 1 filled with 500 grams of developer powder, the drop in the rate of flow (Q) is restricted to about 3 g per min. as shown by line 36 in FIG. 3.

A vane 30 is disposed to be freely pivotable on the horizontal part of the L-shaped bar 18 for detection of a residual supply. When the reservoir is full, vane 30 is pressed into a horizontal position by developer powder flowing along the rotating vane. When the powder level drops below vane 30 the vane turns down to a freely hanging position is shown in FIG. 1, in which position a magnet 32 fixed on the vane comes within the range of a minimum supply detector 31, e.g. a reed contact, once per revolution of the rotor 14 to deliver a low level pulse. On delivery of, for example, three consecutive low-level pulses, a minimum supply signal is delivered, the purpose of this being to exclude instability in the measurement. Since the powder transport device is rendered inoperative on delivery of a minimum supply detection signal and the vane 30 accordingly would remain in its freely hanging position even after the reservoir has been replenished, on the next activation of the copier of which the developing station forms part, the rotor 14 is rotated three times. If, on the third revolution, magnet 32 on vane 30 comes out of the range of the reed contact, it forms a signal that the reservoir has been replenished and, accordingly, the powder transport device is rendered operative.

With the test rig it was found that without active pushing of developer powder the rate of transport (V) was reduced to practically zero even before a residual supply of 100 grams of developer powder in the reservoir 1 was reached, as indicated by line 37 for example. A prediction within certain limits of the quantity of developer powder leaving the reservoir 1 per unit of time is important so that when the quantity of developer powder present in the developing device (not shown) drops below a predetermined level (e.g., in the case of a binary developing system, the fall in the concentration of developer powder in a mixture with carrier particles), approximately the same quantity of developer powder can be metered over a fixed metering period, so that in all cases approximately the same time elapses before the quantity of developer powder in the developing device is once again at the correct level.

When the transport tube 10 is filled with developer powder for the first time, the cylindrical part inside the transport spring 13, in the vertical part of the spring will fill with developer powder which drops off the rotating spring coils. The axle stub 7 prevents this powder from dropping back into the reservoir 1. After the said space inside the spring is filled, the rate of transport is determined by the space between the spring coils. At that rate of transport the powder in the transport tube in the horizontal part will be located substantially in the bottom half of the transport tube where the powder is pushed in front by the spring coils without appreciable turbulence until it drops into the developing device from the transport tube at the end 12. The relatively narrow passage between the tube wall and the axle stub 7 limits the conveying capacity of the transport spring 13 so that at a required rate of transport of, for example, from 3 to 4 grams per minute, the number of revolutions of the transport spring does not become so low that the transport behavior is irregular.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for transporting developing powder from a reservoir to a developing station, comprising a tube provided with an inlet aperture formed by a hole in a wall part of said tube at said reservoir and an outflow aperture at the developing station, said outflow aperture in an operative state being at a level higher than said inlet aperture, pushing means provided in said reservoir to push developer powder present in said reservoir through said inlet aperture in said tube and a helical transport means disposed in said tube, rotatable about its longitudinal axis, which transport means, on rotation, feeds developer powder from said inlet aperture to said outflow aperture, wherein said pushing means comprises at least one blade, which blade is level with said inlet aperture, rotatable about a rotational axis of said transport means forming an obtuse angle ($\alpha$) with a radial plane through said rotational axis intersecting a blade edge of said at least one blade, closest to said rotational axis.

2. A device according to claim 1, wherein said obtuse angle ($\alpha$) is between 95° and 125°.

3. A device according to claim 1 or 2, wherein said pushing means comprises two diametrically opposite blades.

4. A device according to any one of claims 1 and 2, wherein said inlet aperture lies in a plane forming an acute angle ($\beta$) with a radial plane through said rotational axis which intersects an edge of said inlet aperture furthest away from said rotational axis.

5. A device according to claim 3, wherein said inlet aperture lies in a plane forming an acute angle ($\beta$) with a radial plane through said rotational axis which intersects an edge of said inlet aperture furthest away from said rotational axis.

6. A device according to claim 4, wherein said acute angle ($\beta$) is between 30° and 60°.

7. A device according to claim 5, wherein said acute angle ($\beta$) is between 30° and 60°.

8. A device according to claim 1, wherein said edge of said at least one blade closest to said rotational axis and said edge of said inlet aperture furthest away from said rotational axis are situated in substantially the same peripheral plane with respect to said rotational axis.

9. A device according to claim 4, wherein said edge of said at least one blade closest to said rotational axis and said edge of said inlet aperture furthest away from said rotational axis are situated in substantially the same peripheral plane with respect to said rotational axis.

10. A device according to claim 1, wherein said helical transport means is a spiral spring, one end of which extends substantially to the lowest point of said tube and in that an axle stub at said end of said spiral spring extends coaxially so as to fit into said spiral spring over a distance which at least extends over the dimension of said inlet aperture.

11. A device according to claim 1, wherein said pushing means disposed outside said tube and said transport means disposed inside said tube are rigidly interconnected for common drive purposes.

12. A device according to claim 1, wherein said pushing means carries an arm which extends in a horizontal direction in said reservoir and around which a vane is disposed to pivot freely and, on operation of said pushing means and when supply of said developer powder in said reservoir is greater than a minimum supply, is pushed by said developer powder into a position other than the vertical and, when there is a minimum supply of developer powder, hangs freely down so that said vane comes within range of a minimum-supply detector.

* * * * *